June 2, 1970     C. E. GERBER     3,515,426
CAMPER
Filed Feb. 2, 1968     4 Sheets-Sheet 1
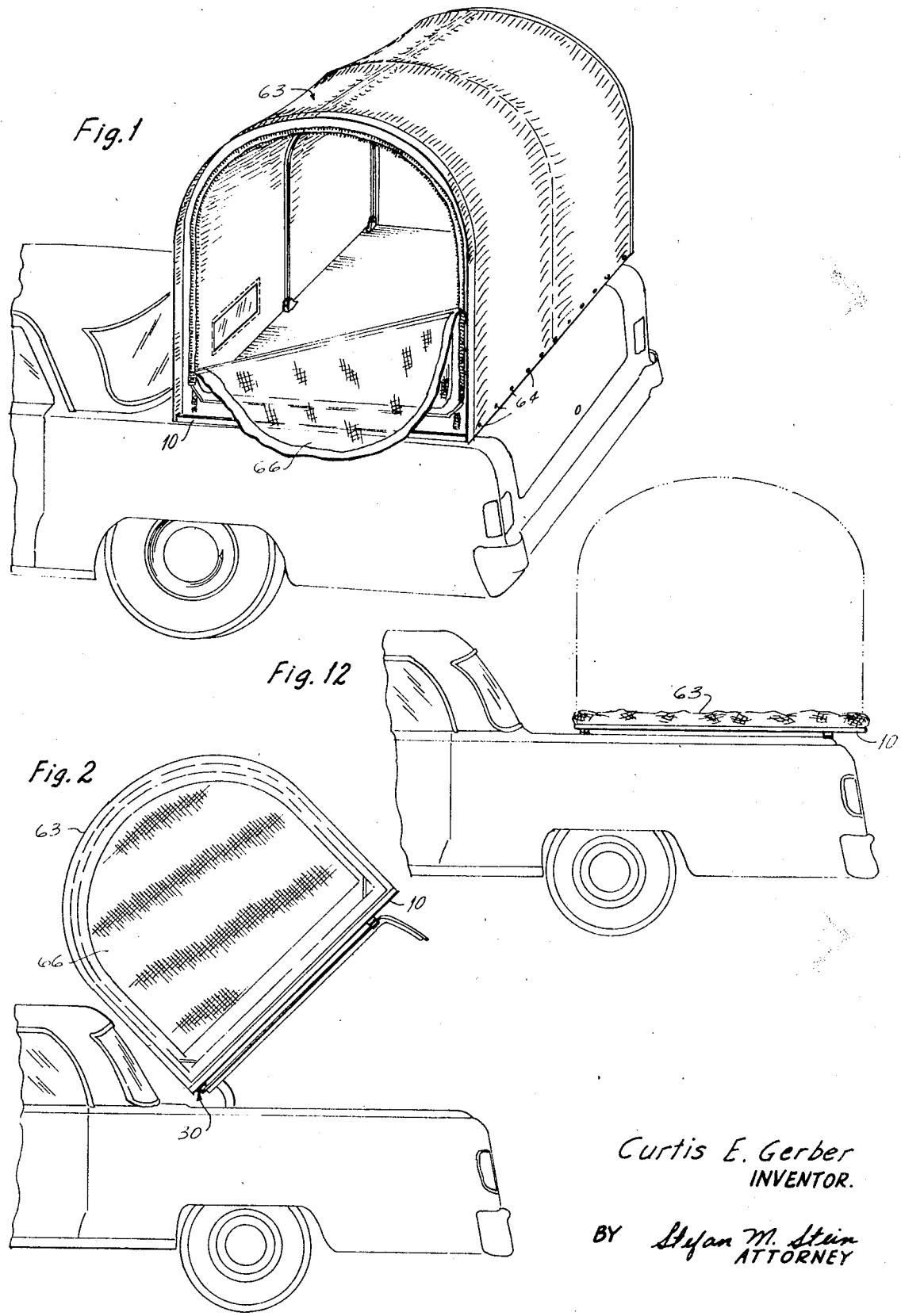
Curtis E. Gerber
INVENTOR.
BY Stefan M. Stein
ATTORNEY Curtis E. Gerber
INVENTOR.

BY Stefan M. Stein
ATTORNEY

June 2, 1970  C. E. GERBER  3,515,426
CAMPER
Filed Feb. 2, 1968  4 Sheets-Sheet 3
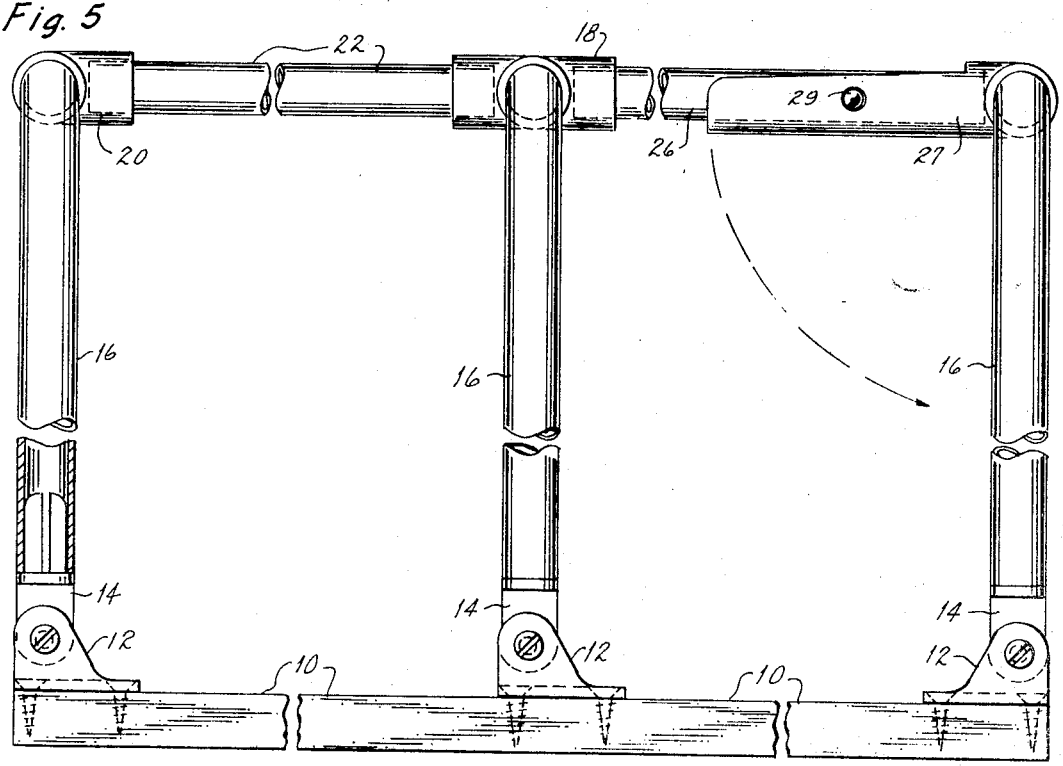
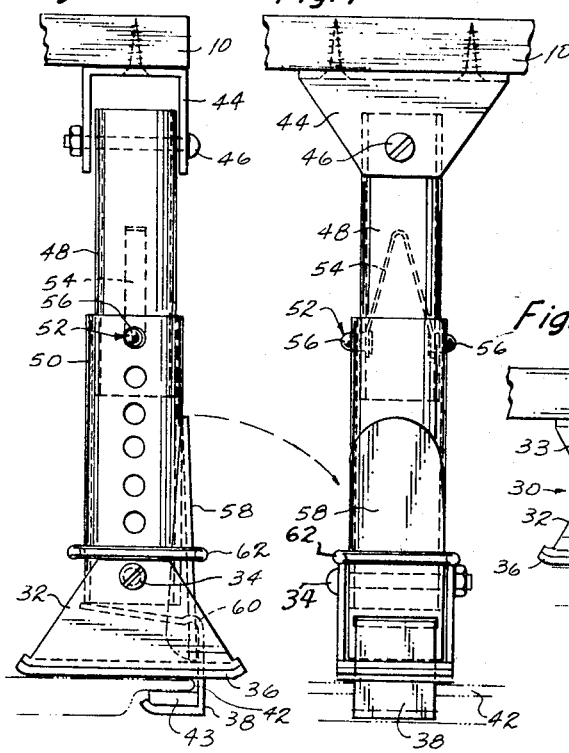
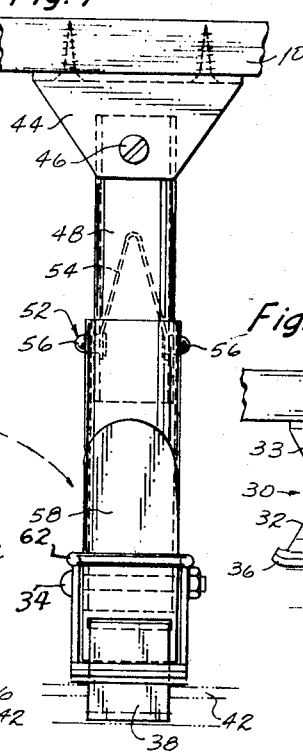
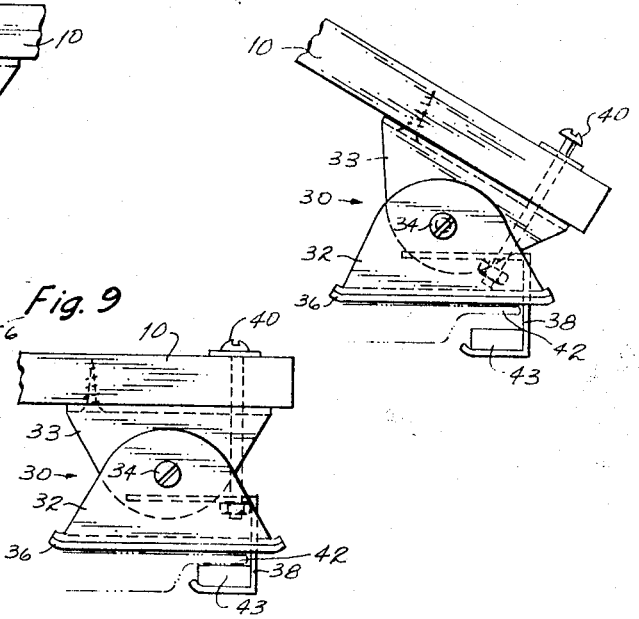
Curtis E. Gerber
INVENTOR
BY Stefan M. Stein
ATTORNEY

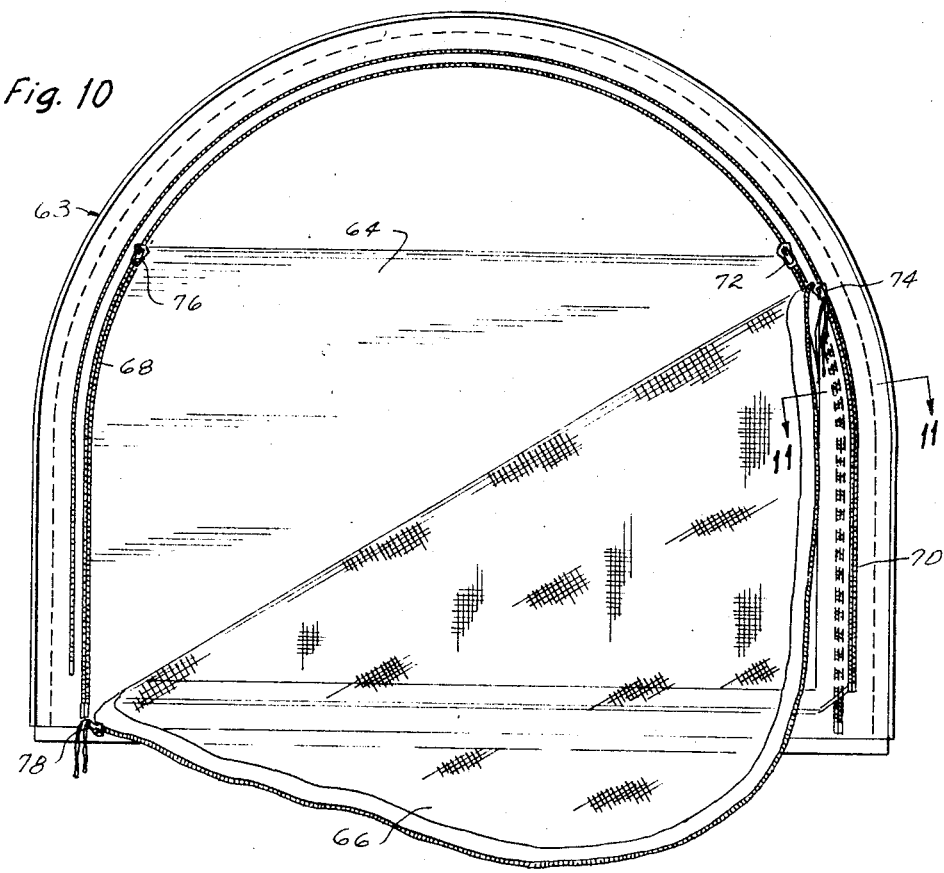
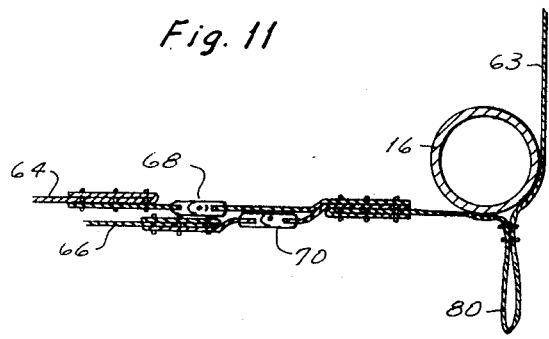

United States Patent Office 3,515,426
Patented June 2, 1970

3,515,426
CAMPER
Curtis E. Gerber, 4015 Bayshore Blvd.,
Tampa, Fla. 33611
Filed Feb. 2, 1968, Ser. No. 702,731
Int. Cl. B60p *3/34*
U.S. Cl. 296—23         14 Claims

ABSTRACT OF THE DISCLOSURE

A collapsible camper having a structure which is mounted entirely upon the trunk lid of an automobile in such manner that the lid can be opened at all time for easy access to the trunk.

---

This invention relates to a camper and more particularly to a collapsible camper which as a structure enabling mounting on the trunk lid of an automobile without external supports.

In recent years, as never before, Americans, in rapidly increasing numbers, have become enthralled with camping outdoors. Many find it to be an economical way to a vacation. Others enjoy the travel aspect of camping. Still others find camping an aid to fishing, hunting, or other outdoor activity.

This great increse in camping has caused a tremendous need for camping equipment of all types. Camping shelters, more easily called "campers" have ranged from a simple canvas tent to elaborate self-contained vans with all the comforts of home. The most popular campers, however, are those which offer the convenience of mobility without the need to assembly the shelter to any great extent after reaching the campsite. Thus, trailers and vans mounted on quarter or half-ton pickup trucks, are most popular. They are popular because they do not hamper the driver of the vehicle and they are quickly assembled if at all required.

With trailers, a second vehicle is obviously required, and such causes increased license fees and tolls, adds driving hazards and frequently limits the area of accessibility to the car-trailer combination.

With truck mounted vans, the expense involved for the camper and the truck itself is too much for the occasional camper. Attempts have been made to mount camp shelters on an automobile to overcome the above undesirable attributes of trailers or van type campers, but with only moderate success. For example, U.S. Pats. 3,097,013 and 3,115,362 show vehicle mounted campers but each is difficult to assemble and each adds a rather extensive length to the original vehicle structure, hampering the driver's visibility and adversely affecting the roadability of the altered vehicle. U.S. Pats. 1,984,681 and 2,561,168 are other variations, though earlier, which have not been accepted by the consumer probably due to their complicated structure or assembly requirements once the campsite has been reached.

It is, therefore, an object of this invention to provide a camper which can be mounted on an automobile without impairing its driveability.

Another object is to provide a camper, of the above character, which requires a minimum of assembly at the campsite.

Still another object is to provide a camper, of the above character, which will not restrict access to the trunk space of an automobile.

A further object is to provide a camper, of the above character, which is mounted solely on the trunk lid to effect the above objectives.

At still further object is to provide a camper, of the above character which has easy collapsibility and assembly.

Another object is to provide a camper, of the above character, which provides a unique amount of visibility to the driver even though trunk mounted on the vehicle.

Another object is to provide a camper which has an auxiliary dressing room feature.

Other objects of the invention will in part be obvious and will in part appear hereinafter.

The camper of this invention, in its most rudimentary form, comprises a platform with trunk-lid clamping means, a collapsible parallelogram frame and a fabric covering. More particularly, the camper of this invention comprises a platform, preferably a 4' x 8' sheet of plywood to which, on the underside, are affixed four trunk-lid clamps. The clamps each have a structure including a pad which rests on the trunk lid and a J clamp which grasps the edge of the lid to retain the platform solely to said lid in horizontal fashion. When collapsed, no obstacle is presented to rear vision, nor to the streamline air flow characteristics of the automobile. Indeed, in collapsed form, or with the arch and covering structure removed, the camper may also be used as a freight transport means. The arch and covering resemble an Old West covered wagon structure when erected. And, the erection procedure involves a simple parallelogram pivoting of two of the arches and a locking of the third arch in an upright position.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a perspective view of the camper of this invention shown mounted on the trunk lid of an automobile.

FIG. 2 is a side view of the camper with trunk lid raised.

FIG. 5 is a detailed view of the pivot and platform fastening elements of the frame.

FIG. 6 is a side view of the rear trunk lid clamp device of the camper.

FIG. 7 is a front view of the rear trunk lid clamp.

FIG. 8 is a detailed view of a front trunk lid clamp showing its action during clamping.

FIG. 9 shows the front trunk lid clamp in clamped condition.

FIG. 10 is a side view of the camper showing the access door as it would appear to a user.

FIG. 11 is a detailed cross-sectional view of the access door taken along lines 11—11 of FIG. 10.

FIG. 12 shows the camper in collapsed and covered condition on an automobile.

Similar reference characters refer to similar parts throughout the several views of the drawings.

As best seen in FIGS. 1 and 2, the camper of this invention is mounted entirely upon the trunk lid of an automobile. It comprises platform 10, preferably of rectangular shape with a length approximately equal to the width of an automobile. The width is sufficient to allow two people to sleep in a tandem (side-by-side) relationship. Platform 10 may be of any suitable rigid material. Plywood is an excellent example of such.

Fastened to the upper surface of platform 10 are a plurality of pivotable platform brackets 12 (six in the illustration shown). The brackets 12 are preferably of cast metal and, as best seen in FIG. 5, are screwed or bolted to platform 10 at positions corresponding to the four corners and the mid-edge portions of the two long sides of the platform 10. Pivot pinned to platform brackets 12 are end plugs 14. Press fitted onto the end plugs are tent arches 16. These arches are preferably of aluminum tubing.

Figure 3:
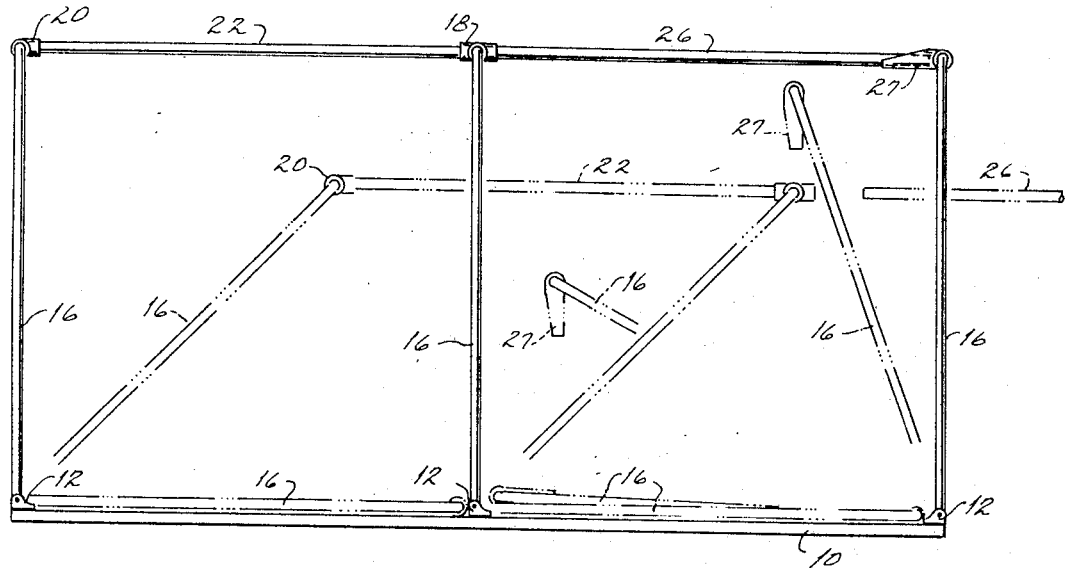
FIG. 3 shows a side view of the frame of the camper, in erected condition.
Figure 4:
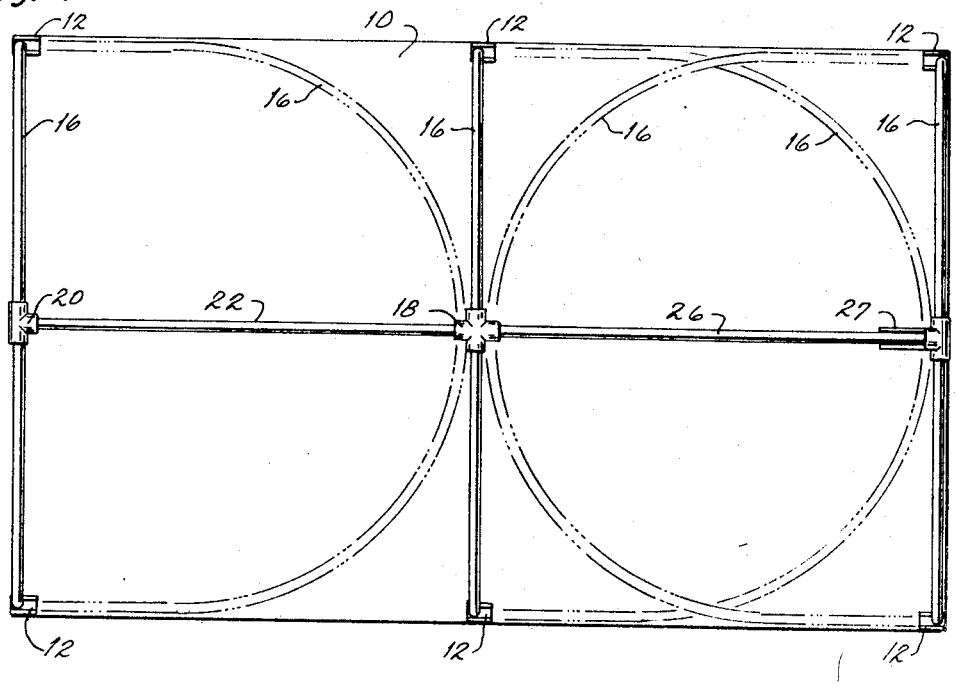
FIG. 4 shows a top view of the camper of this invention.

The height of each arch 16 is preferably approximately half the length of platform 10 so that when pivoted in a down position, each arch can lay flush with platform 10 (see FIGS. 3 and 4). Affixed to the central arch is a tubular X-joint 18. The X-joint 18 is rotatably mounted at the apex of the arch. Its free ends receive a length of tubing hereinafter termed "apex tube 22." One outer arch has a pivotable T-joint 20 at its apex to receive one of the outer ends of apex tube 22. The length of this section of apex tube 22 is equal to the spacing between platform brackets 12; hence, in pivoting the entire framework (the two left arches and the left portion of apex tube 22), a parallelogram structure is provided to ease erection and take-down of the camper.

The right arch 16 pivots about its set of platform brackets 12 (see FIGS. 3 to 5). It too has what might be construed as a pivotable T-joint at its apex, but the T-joint has, in addition, an extended leg of trough shape which receives the free end of the second section 26 of apex tube 22 to act as a locking T-joint 27. Section 26 of apex tube 22 is not permanently affixed to either the X-joint 18 or the T-joint 27, so that it can be easily inserted or removed (see FIG. 3) to enable locking unlocking of the framework in an erected or completely flat position. Lock pin 29 extends transversely through the trough-shaped lid of T-joint 27 and the second section 26 of apex tube 22.

On the underside of platform 10 are four trunk-lid clamps of novel design, two of which are located at the front edge (meaning the edge closest to the front of the automobile—see FIG. 2) of the trunk lid and two at the rear of the side edges of the lid of the automobile. They are affixed to the underside of platform 10 near its four corners. The two trunk lid clamps 30 which affix to the front edge each comprise an upright U-shaped trunk lid pad 32, with a pivot pin 34 extending across the arms of the support (see FIGS. 8 and 9). A second, but inverted U-shaped platform pad 33, which is secured to the platform, pivots about pin 34. A soft scratch prevention rubber sheet 36 is bonded to the undersurface of trunk lid pad 32 whereby the automobile finish will not be marred. Mounted through a slot (not shown) in said pad 32 and rubber sheet 36 is a J-shaped clamp jaw 38, with its long arm extending under pivot pin 34. A jaw locking bolt 40 is mounted through the platform 10 and clamp jaw 38. The short arm of J-clamp 38 clamps under the leading edge of the trunk lid 42. To prevent marring, a soft rubber block 43 is affixed, via an adhesive, to the inside surface of the short arm of the J-clamp.

To clamp the J-clamp about the edge of the trunk lid, platform 10 is rotated downwardly about pin 34, which acts as the fulcrum to elevate J-clamp jaw 38 by the action of clamp jaw locking bolt 40. The bolt 40 may be initially adjusted to provide for the proper clamping force by the simple use of a screw driver.

The two clamps which affix to the rear side edge of the trunk lid are substantially similar in structure in the trunk lid clamping mechanism. Therefore, similar reference characters have been assigned in the description as it proceeds. Each clamp consists of an upright U-shaped trunk lid pad 32 with a rubber sheet 36 on the undersurface. And, mounted through a slot (not shown) in said pad 32 and sheet 36 is a J-shaped clamp jaw 38 with its long arm extending under pivot pin 34 which extends across the arms of U-shaped pad 32. The J-clamp also has a rubber block 43 on its inside surface of its short arm to prevent marring. At this point, the structure of the rear trunk lid clamps begins to differ from the structure of the front trunk lid clamps, the reason being due to the customary acute downward slant of the rear of the trunk lid in most automobiles. In order to hold platform 10 level, it is necessary to "build up" the support structure therefor and such is accomplished by the following difference in structure of the rear versus the front trunk lid clamp.

It will be recalled that platform pad 33 of the front trunk lid clamp is directly pivoted on pin 34 of the trunk lid pad 32. In contrast, an adjustable telescoping extension arm 48 and 50 is pivoted between pin 34 of the rear trunk lid pad 32 and a second pin 46 of the rear platform pad 44. A push button detent 52, comprising an outwardly biased spring-steel V-member 54 with detents 56, fixes the length of the extension arm 48 and 50, once set to the desired length.

The J-clamp jaw 38 of the rear trunk lid clamp pivots about a clamp jaw locking lever 58. Lever 58 serves as a fulcrum, much like clamp jaw locking bolt 40, to lift jaw 38 to tighten it about the edge of lid 42. Clamp jaw 38 is provided with a rounded corner 60 to accommodate lever 58. A loosely fitting round slide ring 62 holds lever 58 in an upright position thereby locking clamp jaw 38.

As best seen in FIGS. 1 and 10, a fabric, preferably a waterproof canvas covering 63, rests on arches 16 and apex tubes 22 and 26. It is fastened to the perimeter of platform 10 by fasteners 65 and is so fitted as to be stretched taut when arches 16 are raised in a vertical position, as described hereinabove. As seen in the raised position, the structure resembles the covered wagon of the Old West.

Referring to FIG. 10, each end of covering 63 is provided with a zippered weather flap 64 and a zippered screen 66. In the preferred arrangement, as best seen in FIG. 10, screen 66 is located externally to the weather flap 64 and each is provided with a zipper 68 and 70, respectively, having two double tab pulls 72 and 74, and 76 and 78, respectively, so that each can be zipped into place from the inside or the outside and at only the left or the right side or both to provide a variable ventilation opening.

FIG. 11 illustrates the details of the zippered flap and screen construction. It will be noted that there is also a loop 80 which may act as a rain canopy or which may be used to affix other structures thereto, such as a dressing room structure.

To use the camper, one mounts it only on the trunk lid 42 of an automobile by clamping clamps 32 onto the lead and side edges of trunk lid 42. The car may then be driven to the campsite with the camper in collapsed condition (see FIG. 12). Upon arrival, the second portion of apex tube 26 is inserted into the open recess of T-joint 18 and the two joined arches 16 swing upwardly in parallelogram fashion (see FIG. 3). The remaining arch 16 is pivoted in the opposite direction to erect it and then the second end of tube 26 is placed into the trough of locking T-joint 27 and the T-joint is rotated upwardly and pin 29 inserted through it to lock the camper in an erect position. Covering 63 is now taut. If desired, a further leveling of the platform may be accomplished, if the automobile is not level, by manipulating the side edge clamps. Detents 52 are pushed in and telescoping members 48 and 50 adjusted to provide a better leveling of platform 10.

From the above description, it should become evident that the advantages of this camper are numerous. It is mounted entirely upon the trunk lid and hence the lid may be raised with the camper in place, either collapsed or erected (see FIG. 2). The camper can be erected at the campsite with a minimum of time or effort. In fact, early tests have shown that a person can leave the driver's seat of the car and easily erect the camper in less than thirty seconds. No mounting holes need be drilled in the automobile or any other modification. Tests have shown that when used with reasonable care, no marring of automobile finish is likely. In the collapsed position, the camper rides low enough so as to allow full visibility in the rear view mirror. An air mattress or thin camping mattress and bed rolls or blankets may be carried laid out and in place when the camper collapsed upon them. Thus, when the camper is erected, all necessary equipment is in place and ready. It should also be noted that the user sleeps "high and dry," off the damp ground, and is protected from crawling bugs, snakes, rodents or small animals. The end flap arrangement provides a completely variable degree of ventilation while still providing protection from flying insetcts.

When not in use, the camper may be collapsed and hung on the garage wall much like a picture, or it might be used for storage or even a play house, or a covered wagon, if wheels are mounted to the platform, for children.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A camper comprising platform, clamping means attached to said platform and adapted to be clamped solely upon an antomobile trunk lid, a support frame adapted to support a fabric covering fitted over said frame and wherein said support frame comprises at least two arches pivotally connected to said platform, a rigid, unitary, horizontal support member, pivotally connecting the apexes of said two pivotally connected arches so that said support frame can be pivoted from an open, substantially perpendicular position, to a collapsed position whereby said arches are substantially parallel to said platform.

2. The camper of claim 1 wherein said clamping means comprises a trunk lid pad operatively connected to said platform with a J-clamp jaw extending therethrough, said jaw operatively connected to said platform whereby said jaw is tightened upon the edge of said trunk lid.

3. Clamping means for the front edge of the camper of claim 1 comprising a platform pad, and a trunk lid pivotally joined to a common pivot pin, said trunk lid pad having a slot therein with a horizontally disposed J-clamp jaw extending therethrough, and an adjustable bolt connecting said J-clamp jaw and said platform whereby said jaw may be tightened upon the front edge of the trunk lid of an automobile.

4. The camper of claim 1 wherein said clamping means comprises a platform pad, and a trunk lid pad pivotally joined together, said trunk lid pad having a J-clamped jaw extending therethrough and means connected with said platform to tighten said jaw upon the edge of said trunk lid.

5. The camper of claim 4 wherein said clamping means is for the front edge of said camper and comprises a platform pad, and a trunk lid pad pivotally joined to a common pivot pin, said trunk lid pad having a slot therein with a horizontally disposed J-clamp jaw extending therethrough, and an adjustable bolt connecting said J-clamp jaw and said platform whereby said jaw is tightened upon the front edge of said trunk lid.

6. The camper of claim 4 where said clamping means is for the rear edge of said camper and comprises a platform pad, a trunk lid pad, an adjustable telescoping extension arm pivoted at one end to said platform pad and at the other end to said trunk lid pad, said trunk lip pad having a slot therein with a horizontally disposed J-clamp jaw extending therethrough, a clamp jaw locking lever operatively connected to said J-clamp jaw whereby upon manipulation of said lever, said jaw is tightened upon the rear edge of said trunk lid, and means to lock said lever to lock said J-clamp jaw tightly.

7. The camper of claim 6 wherein said means to lock said locking lever comprises a slidable ring about said extension arm.

8. The camper of claim 1 wherein said covering is provided on at least one of its ends with an exterior screen and an interior weather flap.

9. The camper of claim 8 wherein said covering has, in addition, a rain canopy above said screen and said weather flap.

10. Clamping means for the rear edge of the camper of claim 1 comprising a platform pad, a trunk lid pad, an adjustable telescoping extension arm pivoted at one end to said platform pad and at the other end to said trunk lid pad, said trunk lid pad having a slot therein with a horizontally disposed J-clamp jaw extending therethrough, a clamp jaw locking lever operatively connected to said J-clamp jaw whereby upon manipulation of said lever, said jaw may be tightened upon the rear edge of the trunk lid of an automobile, and means to lock said lever to lock said J-clamp jaw tightly.

11. The clamping means of claim 10 wherein said means to lock said locking lever comprises a slidable ring about said extension arm.

12. The camper of claim 1 wherein said support frame comprises a first and second arch pivotally connected to said platform by a unitary rigid horizontal support member pivotally connecting the apexes of said first and second arches, a third arch pivotally connected to said platform, a detachably connected horizontal support member connecting said second and said third arch, whereby said arches cannot be collapsed until said support member is detached.

13. The camper of claim 12 wherein tensioning means are provided whereby said support frame is made rigid when in the opened position.

14. The camper of claim 12 further comprising locking means which are adapted to lock said support frame in the open position.

References Cited

UNITED STATES PATENTS

| | | | |
|---|---|---|---|
| 3,115,362 | 12/1963 | Spurrier | 296—23 |
| 1,424,222 | 8/1922 | Tuttle | 296—23.1 |
| 3,143,264 | 3/1964 | Spero | 224—42.1 |

FOREIGN PATENTS 998,856   9/1951   France.

PHILIP GOODMAN, Primary Examiner

U.S. Cl. X.R.

224—42.1; 135—1